(12) United States Patent
Yamashita et al.

(10) Patent No.: US 7,291,935 B2
(45) Date of Patent: Nov. 6, 2007

(54) VEHICLE GENERATOR CONTROL DEVICE

(75) Inventors: Yukihiro Yamashita, Takahama (JP); Makoto Miwa, Kariya (JP); Daiji Isobe, Toyohashi (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/445,185

(22) Filed: Jun. 2, 2006

(65) Prior Publication Data

US 2006/0273591 A1    Dec. 7, 2006

(30) Foreign Application Priority Data

Jun. 2, 2005  (JP)  ............... 2005-162648

(51) Int. Cl.
 B60K 1/00   (2006.01)
 B60K 6/02   (2006.01)
(52) U.S. Cl. .................. 290/40 C; 185/65.2; 185/65.3; 320/136
(58) Field of Classification Search .............. 290/40 C; 180/65.2, 65.3; 320/136
 See application file for complete search history.

(56) References Cited

U.S. PATENT DOCUMENTS 5,336,932 A    8/1994  Barske
5,984,033 A  * 11/1999  Tamagawa et al. ......... 180/65.2
6,301,529 B1 * 10/2001  Itoyama et al. ............... 701/22
6,621,250 B1    9/2003  Ohkubo et al.
6,629,027 B2 *  9/2003  Yamaguchi et al. .......... 701/22
6,702,053 B2 *  3/2004  Nogi et al. ................. 180/65.2
6,792,750 B2 *  9/2004  Nagai et al. .................. 60/285
6,856,034 B2 *  2/2005  Peters et al. ............. 290/40 C
6,991,052 B2 *  1/2006  Nogi et al. ................. 180/65.2
7,152,395 B2 * 12/2006  Inoue et al. ................... 60/286

FOREIGN PATENT DOCUMENTS

| DE | 10349164 A1 | * | 5/2004 |
| EP | 811523 A1 | * | 12/1997 |
| JP | 02211219 A | * | 8/1990 |
| JP | 09327103 A | * | 12/1997 |
| JP | 2000-4502 | | 1/2000 |

* cited by examiner

Primary Examiner—Joseph Waks
(74) Attorney, Agent, or Firm—Nixon & Vanderhye P.C.

(57) ABSTRACT

A generator control device controls a generator that is driven by an engine to charge a battery and supply electric power to electric loads. In the generator control device the following steps are carried out: calculating a required electric power; calculating a difference rate that is a difference in an amount of a hazardous gas component of engine exhaust gas between a first case in which the generator generates the required electric power and a second case in which the generator does not generate an electric power divided by the electric power and controlling the generator to generate the required electric power if the difference is equal to or smaller than a first reference value.

14 Claims, 7 Drawing Sheets

VEHICLE GENERATOR CONTROL DEVICE

CROSS REFERENCE TO RELATED APPLICATION

The present application is based on and claims priority from Japanese Patent Application 2005-162648, filed Jun. 2, 2005, the contents of which are incorporated herein by reference.

BACKGROUND OF THE INVENTION

1. Field of the Invention

The present invention relates to a generator control device that controls a generator so as to effectively reduce hazardous components of engine exhaust gases.

2. Description of the Related Art

Usually, a vehicle-mounted generator is controlled by controlling its field current according to a battery condition so that the battery does not become over-discharged, as shown in JP-A 2000-4502 or U.S. Pat. No. 6,621,250. Because the generator is driven by an engine, the fuel consumption of the engine increases as the load of the engine becomes heavier. As the engine load increases due to increase in the output electric power of a generator, more hazardous gas components such as NOx component are emitted from the engine.

U.S. Pat. No. 5,336,932A discloses an engine control device to operate a generator only when the fuel consumption can be controlled within a low level. However, it is difficult to limit the hazardous components when a large amount of electric power is required generated.

SUMMARY OF THE INVENTION

Therefore, a main object of the invention is to provide an improved generator control device that can control hazardous components emitted from an engine when a generator is operated.

According to a feature of the invention, a generator control device for controlling a generator that is driven by an engine includes first means for calculating a required electric power, second means for calculating a difference relating to an amount of a hazardous gas component of engine exhaust gas between a first case in which the generator generates the required electric power and a second case in which the generator does not generate an electric power, and third means for controlling the generator to generate the required electric power if the difference is equal to or smaller than a first reference value.

Thus, a hazardous component can be controlled at a low level. The battery is mainly charged while the emission of hazardous components is within a low level.

Preferably the second means calculates a difference rate (CEM) in an amount of a hazardous component per an electric power to be generated. The difference rate makes the calculation easier. The third means may further detect current charged into and discharged from the battery, calculate a battery charge ratio, and control the generator to charge the battery if the battery charge ratio is not larger than a second reference value even if the difference rate is larger than the first reference value.

In addition, the second means may calculate a difference between a first amount of fuel consumption when the generator generates no electric power and a second amount of fuel consumption when the generator generates a required electric power so as to provide the difference rate, and the third means may control the generator according to an increase in fuel consumption. In this case, the third means may control the generator to operate in one of a fuel-economic generation range and an emission control generation range according to a predetermined condition. Further, the third means may control the generator to operate according to electric power consumption, or engine operating condition.

The second means may include correction means for correcting the difference relating to an amount of hazardous gas component according to engine coolant temperature, or EGR (Exhaust Gas Re-circulation) condition.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A generator control device according to the first embodiment of the invention will be described with reference to FIGS. 1-3.

Figure 1:
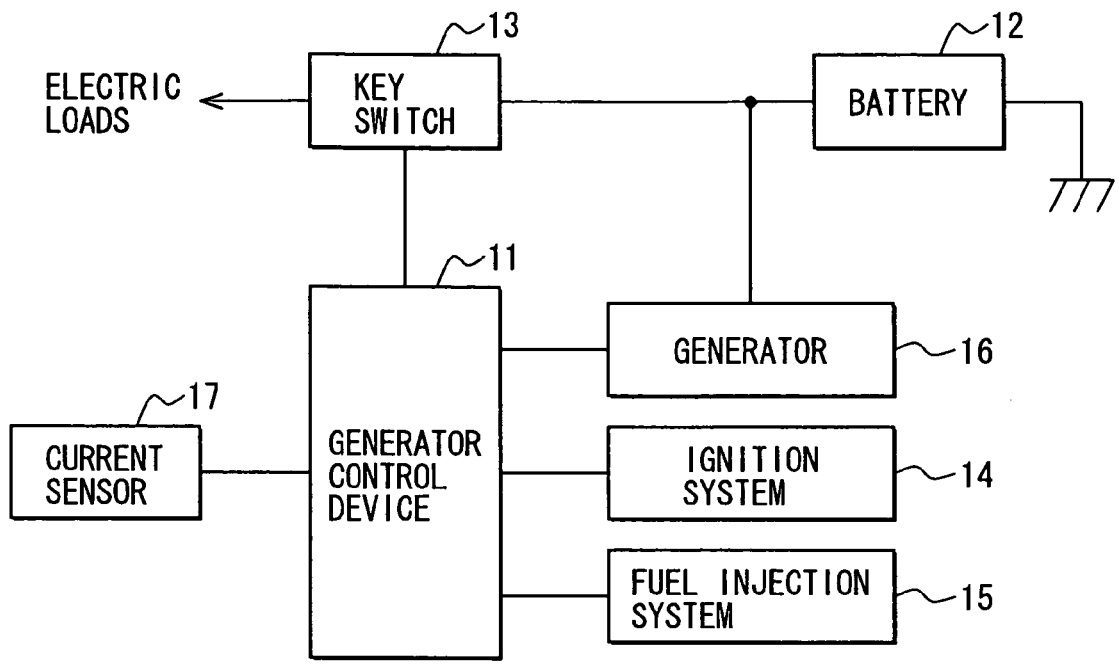
FIG. 1 is a block diagram of a generator control system that includes a generator control device according to the first embodiment of the invention.

As shown in FIG. 1, a generator control device 11 according to the first embodiment of the invention is connected to a battery 12 via a key switch 13, an engine ignition system 14, a fuel injection system 15, an alternator (ac generator) 16 and a current sensor 17. The generator control device 11 is powered by the battery 12 to control the ignition system 14, the fuel injection system 16 as well as the generator 16. The generator control device 11 calculates a charge ratio SOC of the battery 12 and controls the generator 16 according to the charge ratio SOC. In the calculation of the charge ratio SOC, each amount of current charged into or discharged from the battery 12 is accumulated. That is, the amount of the current charged into the battery 12 is added, and the amount of the current discharged from the battery 12 is subtracted.

Figure 2:
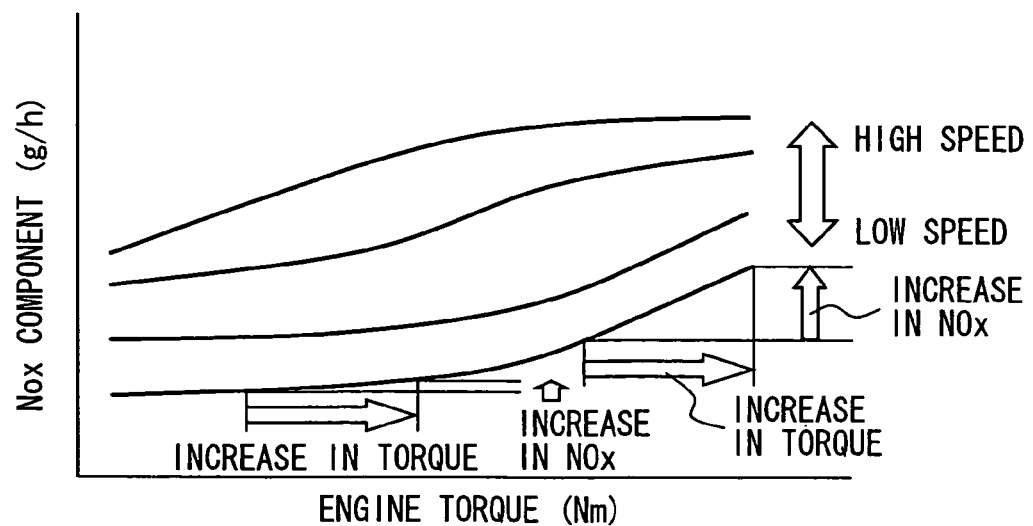
FIG. 2 is a graph showing a relationship between amounts of NOx component emitted from an engine and engine torques.

As shown in FIG. 2, the amount of the NOx component that is emitted from an engine varies as the engine torque changes. If the engine rotation speed is constant, the increase rate of the NOx component becomes higher when the engine rotation speed is low. On the other hand, the increase rate of the NOx component becomes lower than the increase rate of the engine torque when the engine rotation speed is high.

When the generator 16 generates a certain amount of electric power, a corresponding generation torque is added to the engine, resulting in change in the engine operating condition. This changes emission of the NOx component. Therefore, it is possible to control the emission of the NOx component by selecting the engine operating condition.

Figure 3:
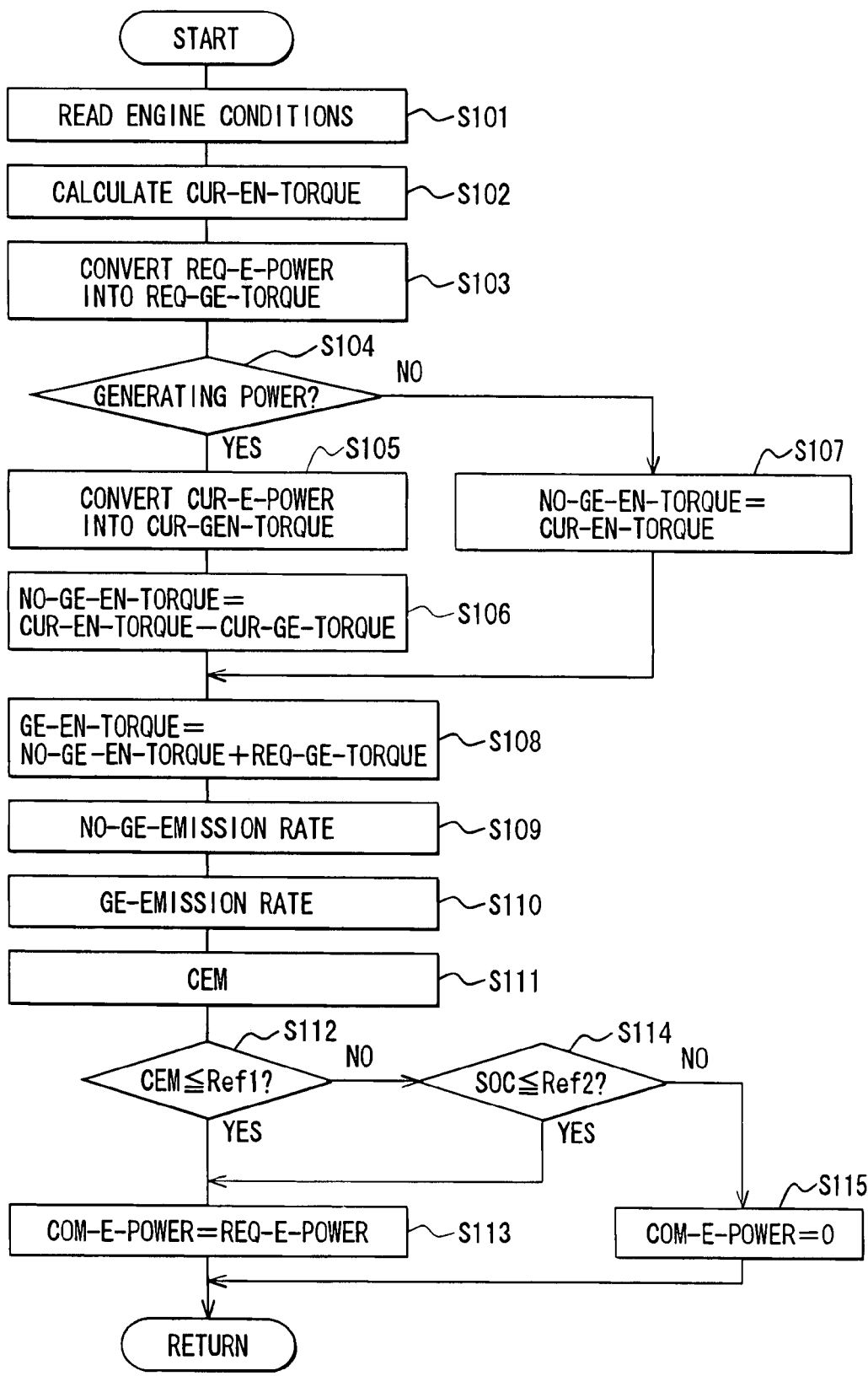
FIG. 3 is a flow diagram of a generation control routine of the generator control device according to the first embodiment.

The generator control device 11 operates according to a generation control routine shown in FIG. 3. The control routine is repeated at a certain cycle, such as 8 ms.

Firstly, at step S101, certain engine conditions, such as an engine rotation speed, an intake air ratio and a required electric power, are read. Incidentally, a required electric power is calculated based on a difference in the current charge ratio SOC between a current ratio and a target ratio.

Thereafter, a current engine torque is calculated from current engine conditions at S102. Subsequently, a required electric power is converted into the term of a required generation torque to generate the required electric power, which is stored into a RAM of the control device 11 at S103. At the next step S104, whether the alternator 16 is generating electric power or not is examined.

If the result of the examination at S 104 is Yes, the step goes to S105, where a current generation torque is calculated from the currently generated electric power and is stored into the RAM of the control device 11. Subsequently at S106, the current generation torque is subtracted from the current engine torque to get an engine torque without electric generation, which is a torque necessary for the engine to operate when the alternator does not generate electric power.

If the result of the examination at S104 is No on the other hand, the step goes to S107, where it is determined that the current engine torque is the engine torque without electric generation.

At the next step S108, the engine torque without electric generation calculated at S106 and the required generation torque calculated at S103 are added together to get an engine torque with electric generation, which is a torque necessary for the engine to operate when the alternator generates electric power.

At the next step S109, a no-generation emission rate of hazardous components (g/s) that corresponds to a current engine rotation speed and the engine torque without electric generation is calculated based on a map shown in FIG. 2. The no-generation emission rate corresponds to an emission rate of hazardous components when the alternator 16 does not generate electric power. Incidentally, the map stores emission rates of hazardous components that are measured at normal engine operating conditions beforehand.

Thereafter, the step goes to S110, where a generation emission rate of hazardous components (g/s) that corresponds to a current engine rotation speed and the engine torque with electric generation is calculated based on the map. The generation emission rate corresponds to an emission rate of hazardous components when the alternator 16 generates an amount of electric power.

At the next step S111, a difference between the generation emission rate of hazardous components and no-generation emission rate of hazardous components is divided by a current electric power generated by the alternator 16 to obtain a difference rate CEM (g/s·kw). That is:

$$CEM\ g/s\cdot kw = (RC1 - RC2)/P,$$

wherein RC1 is a rate of hazardous components emitted while the alternator 16 is generating an electric power P, RC2 is a rate of hazardous components emitted while the alternator 16 is not generating electric power.

Thus, an increase or decrease in the hazardous components per a unit of generated electric power can be calculated. Thereafter, the step goes to S112, where the difference rate CEM is compared with a preset reference value Ref 1.

If the difference rate CEM is equal to or smaller than the reference value Ref1, Yes is issued, so that the step goes to S113, where a command electric power is set to the required electric power. In other words, it is determined that the increase in the hazardous components is within an allowable range.

If the difference rate CEM is larger than the reference value Re1, No is issued, so that the step goes to S114, where the charge ratio SOC of the battery 12 is compared with a reference value Ref 2.

If the charge ratio SOC is equal to or smaller than the reference value Ref 2, the step goes to S113, where the required electric power is set to the command electric power, as it is determined that the battery 12 is not normally charged. Therefore, the alternator 16 is controlled to generate an electric power sufficient to charge the battery 12 to increase the charge ratio SOC irrespective of increase in the difference rate CEM.

If, on the other hand, the charge ratio is larger than the reference value Ref 2, the step goes to S115, where the command electric power is set to 0. Accordingly, the alternator is controlled to stop generation to decrease the hazardous components.

A generator control device according to the second embodiment of the invention will be described with reference to FIGS. 4-6.

Figure 4:
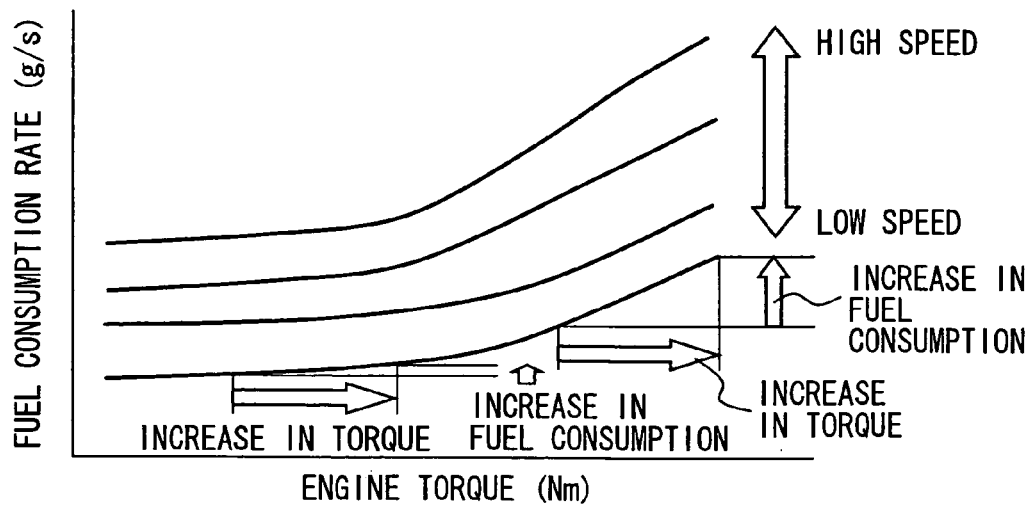
FIG. 4 is a graph showing a relationship between fuel consumption rates and engine torques.

As shown in FIG. 4, the fuel consumption rate varies with the engine rotation speed and the engine torque. In particular, the fuel consumption rate significantly increases as the torque increases. Therefore, it is useful to take a fuel consumption increase rate into account in addition to the difference rate CEM described above. The fuel consumption increase rate is a difference rate CFC (g/s·kw) in the fuel consumption rate between a condition in which the alternator generates an electric power and a condition in which the alternator generates an electric power that is divided by a current electric power generated by the alternator 16.

Figure 6:
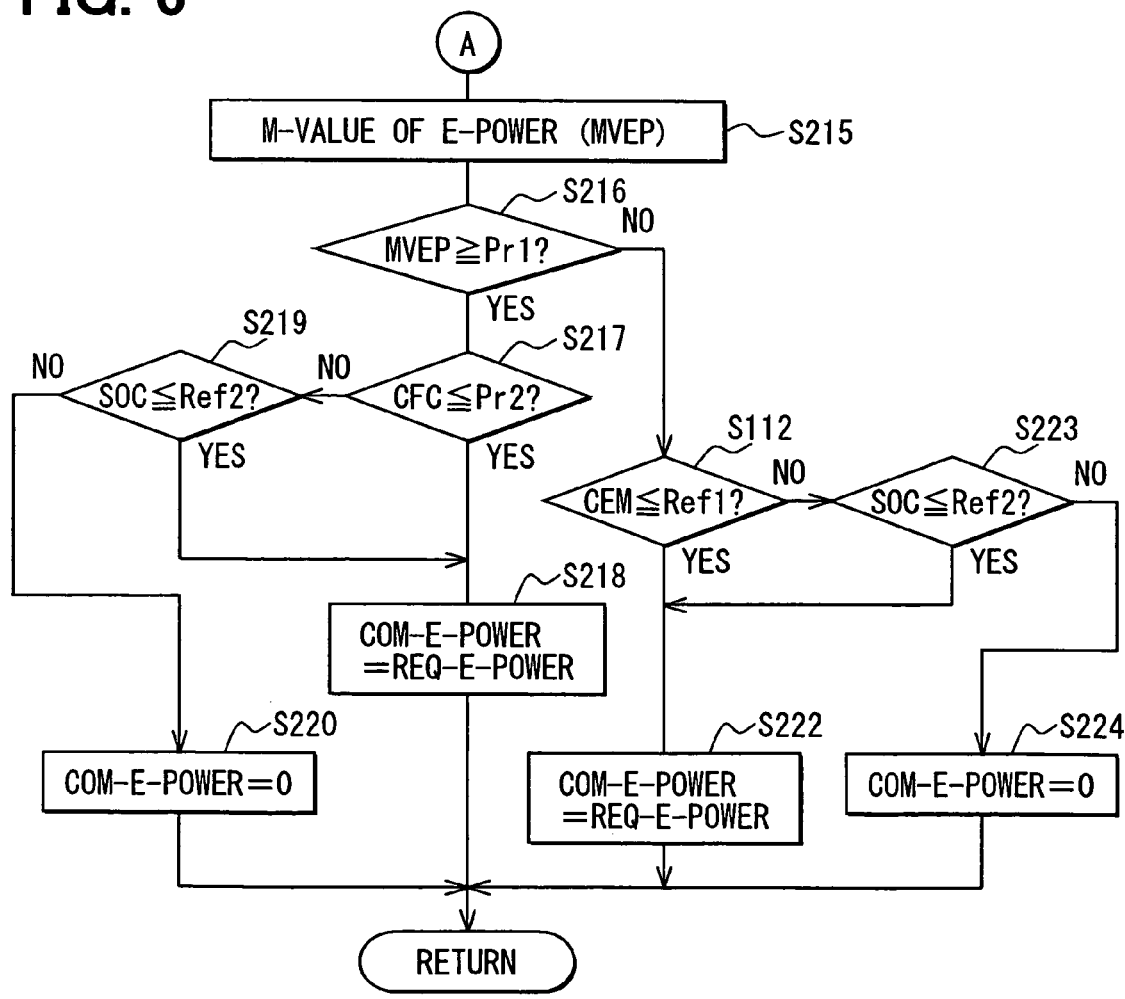
FIG. 6 is a flow diagram of the rest of the generation control routine of the generator control device according to the second embodiment.
Figure 5:
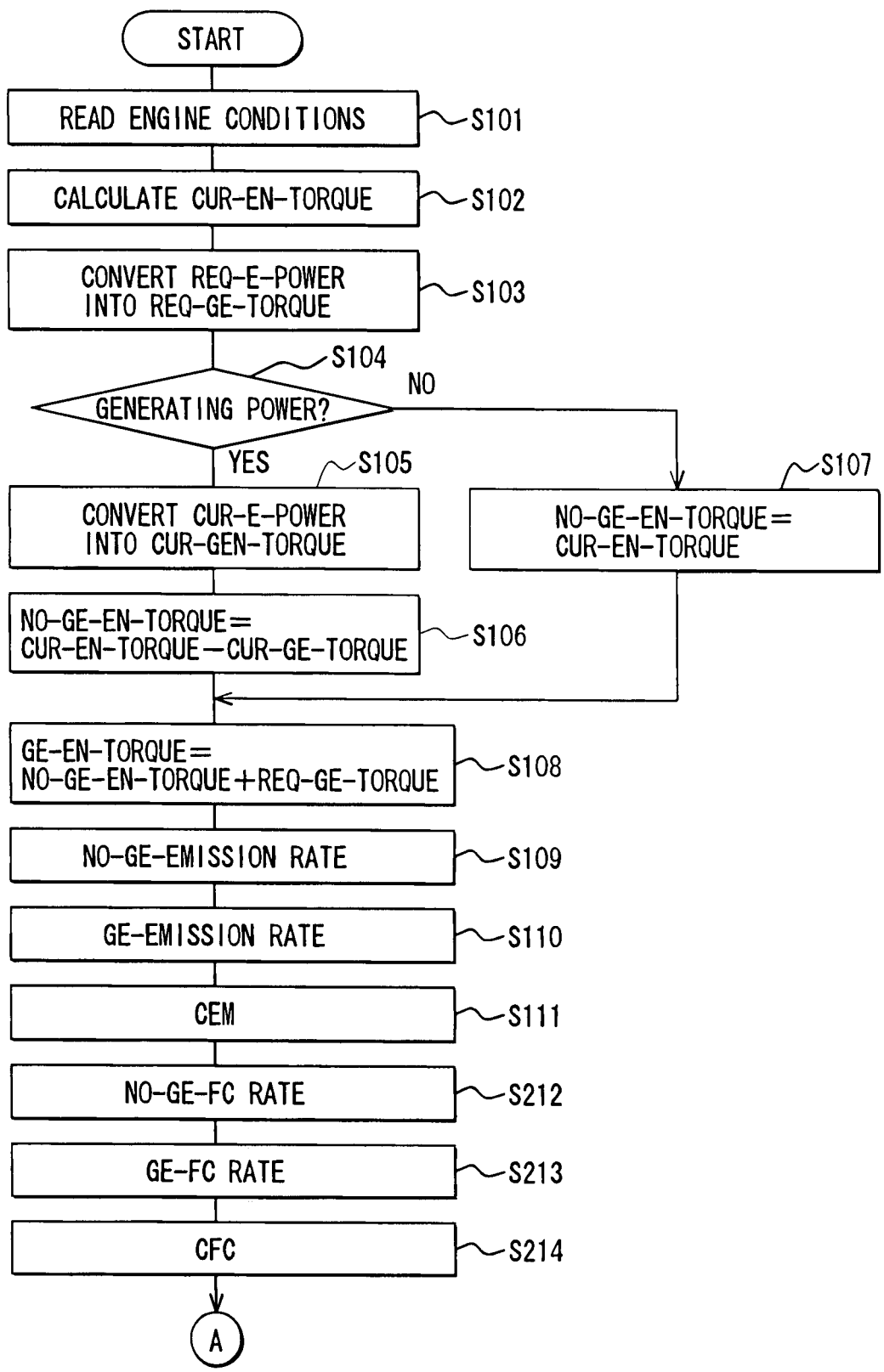
FIG. 5 is a flow diagram of a portion of a generation control routine of the generator control device according to the second embodiment of the invention.

The generator control device 11 operates according to a generation control routine shown in FIGS. 5 and 6. The control routine is repeated at a certain cycle, such as 8 ms. The control routine includes the same steps S101-S111 for providing the difference rate CEM as the control routine of the generator control device according to the first embodiment. At the next step S212, a no-generation fuel consumption rate (g/s) that corresponds to a current engine rotation speed and the engine torque without electric generation is calculated based on a map shown in FIG. 4. The no-generation fuel consumption rate corresponds to a fuel consumption rate when the alternator 16 does not generate electric power. The no-generation fuel consumption rates are measured at normal engine operating conditions and stored into the map beforehand.

Thereafter, the step goes to S213, where a generation fuel consumption rate (g/s) that corresponds to a current engine rotation speed and the engine torque with electric generation is calculated based on the map. The generation fuel consumption rate corresponds to a fuel consumption rate when the alternator 16 generates an amount of electric power.

At the next step S214, the fuel consumption increase rate is calculated as follows:

$$CFC\ (g/s \cdot kw) = (FC1 - FC2)/P,$$

wherein FC1 is a rate of the fuel consumption while the alternator 16 is generating an electric power P, FC2 is a rate of the fuel consumption while the alternator 16 is not generating electric power.

Thereafter the step goes to S215, where a mean value of electric power consumption is calculated by means of annealing process or the like. At the next step S216, whether the mean value of the electric power consumption is equal to or larger than a predetermined value Pr1 or not is examined.

If the result of the examination at S216 is Yes, a fuel-economic generation is selected and the step goes to S217, where if the fuel consumption increase rate CFC is equal to or smaller than a predetermined value Pr2 is examined to go to S218, if the examination result is Yes, to set the command electric power to the required electric power. In other words, it is determined that the increase in the fuel consumption increase rate is within an allowable range. If the fuel consumption increase rate CFC is not smaller than a predetermined value Pr2 (No), the step goes to S219, where the charge ratio of the battery SOC is compared with a predetermined value Ref 2 to go to S218 to set the command electric power to the required electric power if the charge ratio SOC is equal to or smaller than Ref 2 (i.e. Yes, battery is considered to be discharged). On the other hand, if the charge ratio SOC is not equal or smaller than Ref 2 (No), the step goes to S220 to set the command electric power to 0. In other words, it is determined that the charge ratio is within an allowable range.

If the result of the examination at S216 is No, a emission control generation is selected and the step goes to S221, where if the difference rate CEM is equal to or smaller than the predetermined value Ref 1 is examined to go to S222, if the examination result is Yes, to set the command electric power to the required electric power. In other words, it is determined that the increase in the emission increase rate is within an allowable range. If the difference rate CEM is not smaller than the predetermined value Ref1 (No at S221), the step goes to S223, where the battery charge ratio SOC is compared with the predetermined value Ref 2 to go to S224 to set the command electric power to 0, if the result is No. In other words, it is determined that the charge ratio is within an allowable range. Otherwise, the step goes to S222 to set the command electric power to the required electric power.

Figure 7:
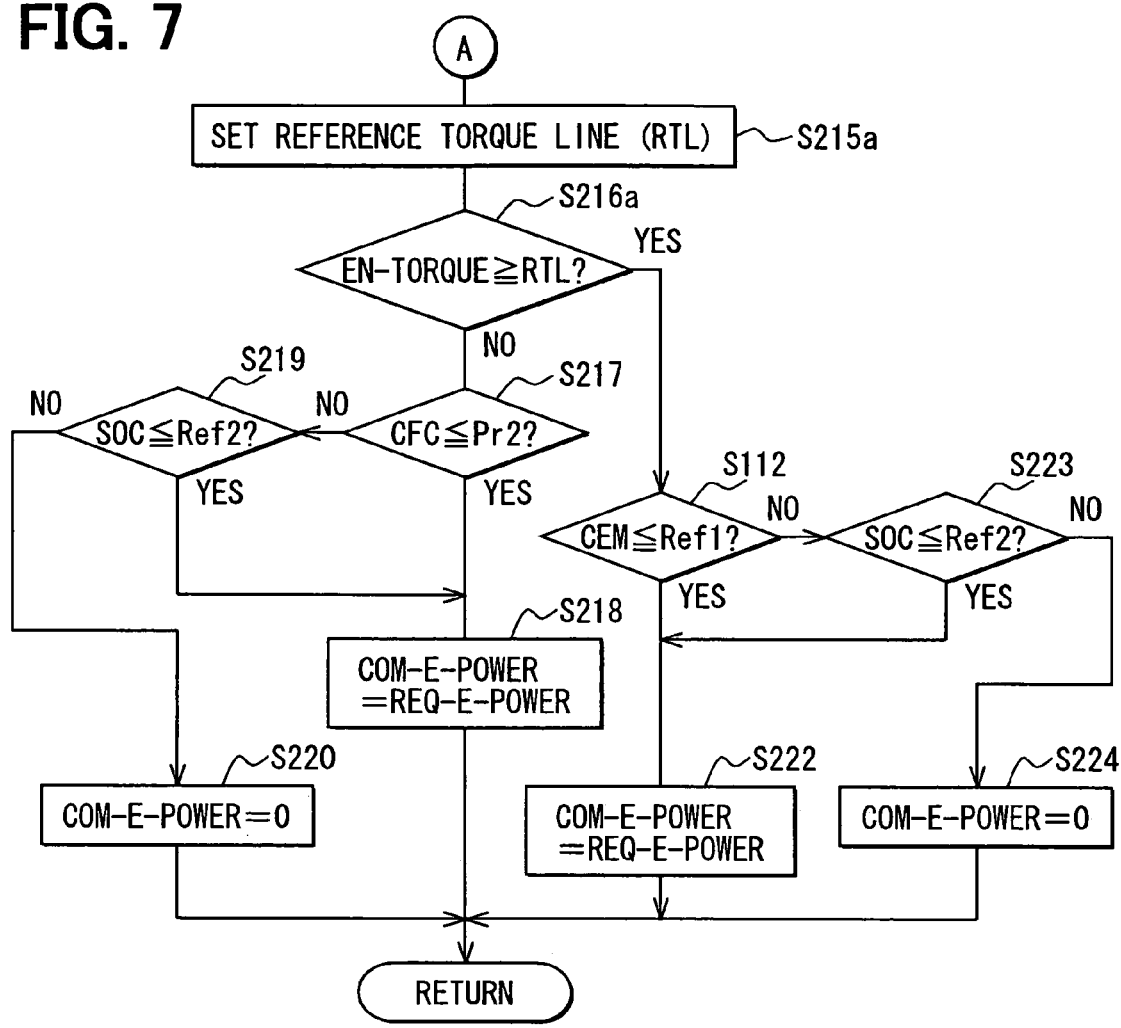
FIG. 7 is a flow diagram of a portion of a generation control routine of the generator control device according to the third embodiment of the invention.

A generator control device according to the third embodiment of the invention will be described with reference to FIGS. 7 and 8.

In order to select fuel-economic electric generation or emission control generation, the control routine of this embodiment includes steps S215a and S216a instead of the steps S215 and 216 of the second embodiment. The other steps are the same as those of the second embodiment.

Figure 8:
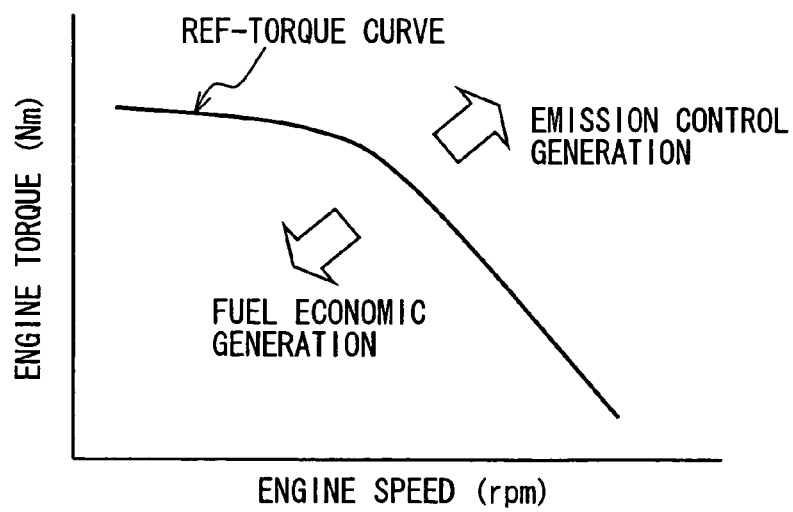
FIG. 8 is a map defining a relationship between engine rotation speeds and engine torques.

As shown in FIG. 8, the fuel-economic generation range and the emission control generation range are selected by a reference torque curve along which the torque decreases as the engine rotation speed increases.

At S215a, the fuel-economic generation range and the emission control generation range are provided to be selected by the reference torque curve. At the next step S216a, the current engine torque is compared with a torque level on the reference torque curve at the same engine rotation speed as the current engine rotation speed.

If the current engine torque is smaller than the torque level (No), the step goes to S217 to compare the fuel consumption increase rate CFC with the predetermined value Pr2, which is described above. If, on the other hand, the current torque is not smaller than the torque level (Yes) the step goes to S221 to compare the difference rate CEM with the predetermined value Ref 1 as described above. Thus, as the engine rotation speed increases, the emission control range expands.

A generator control device according to the fourth embodiment of the invention will be described with reference to FIGS. 9-11.

The emission increase rate varies with the engine coolant temperature, the air intake air temperature, the air-fuel ratio, the EGR ratio, EGR system condition, etc. The generator control device according to the fourth embodiment of the invention controls the generator taking some of the above information into account in addition to the difference rate CEM described above.

Figure 9:
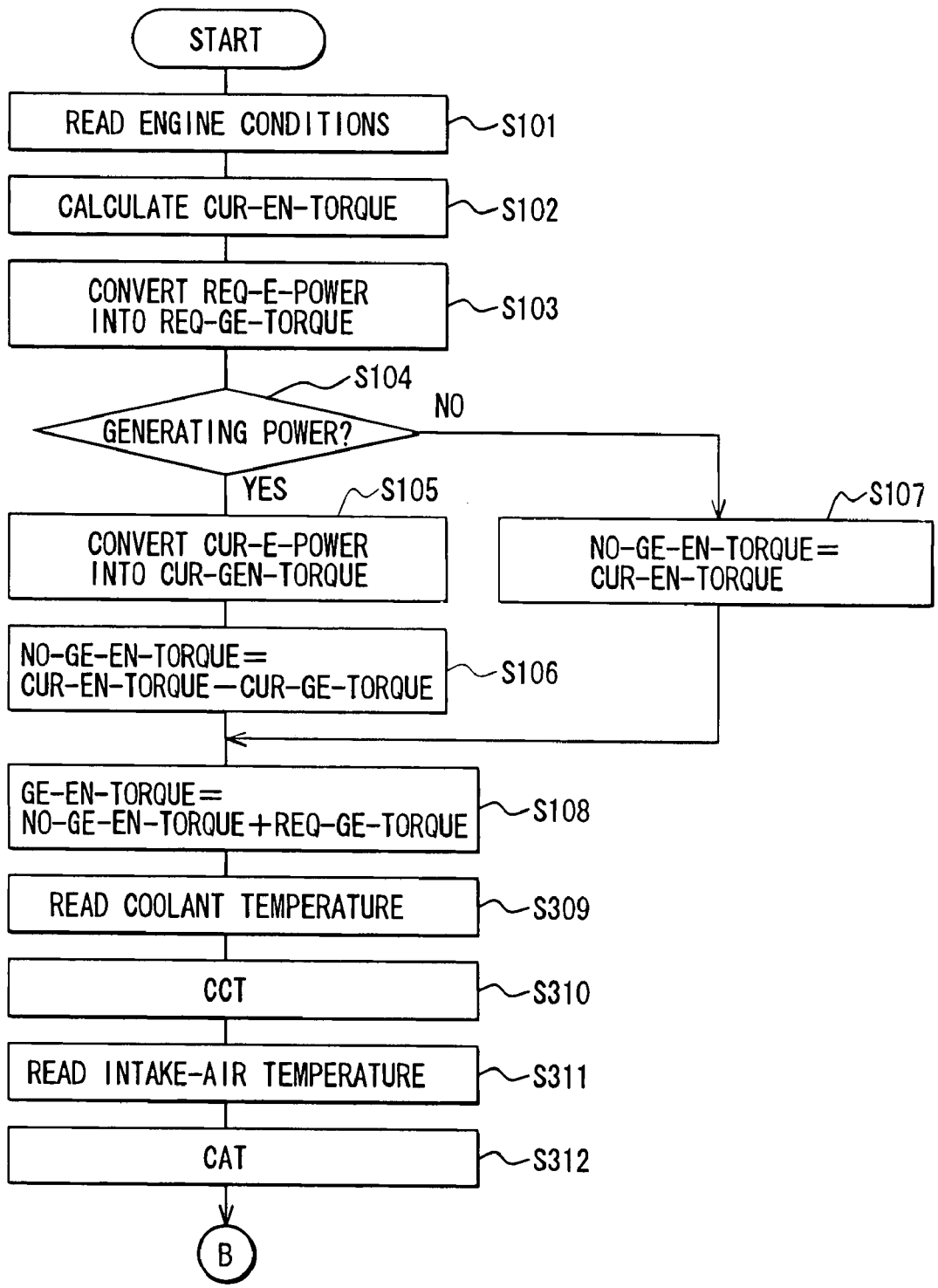
FIG. 9 is a flow diagram of a generation control routine of the generator control device according to the fourth embodiment of the invention.
Figure 10:
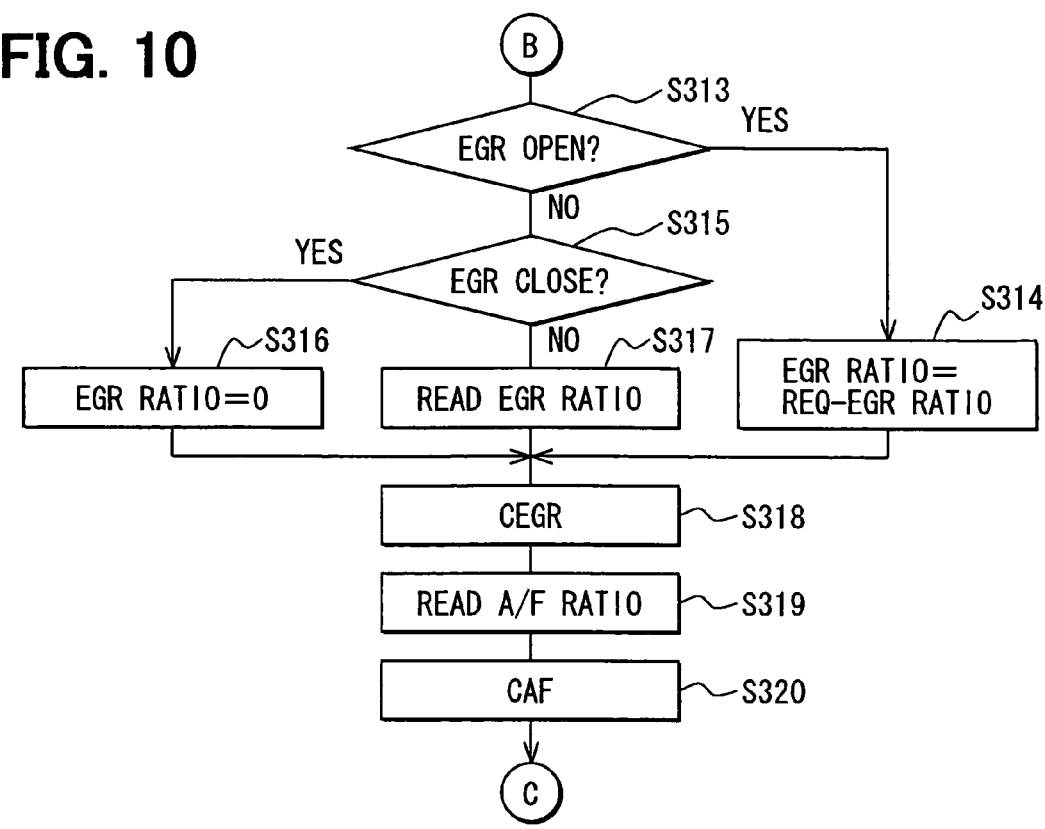
FIG. 10 is an electronic circuit formed on a circuit board according to the fifth embodiment of the invention.
Figure 11:
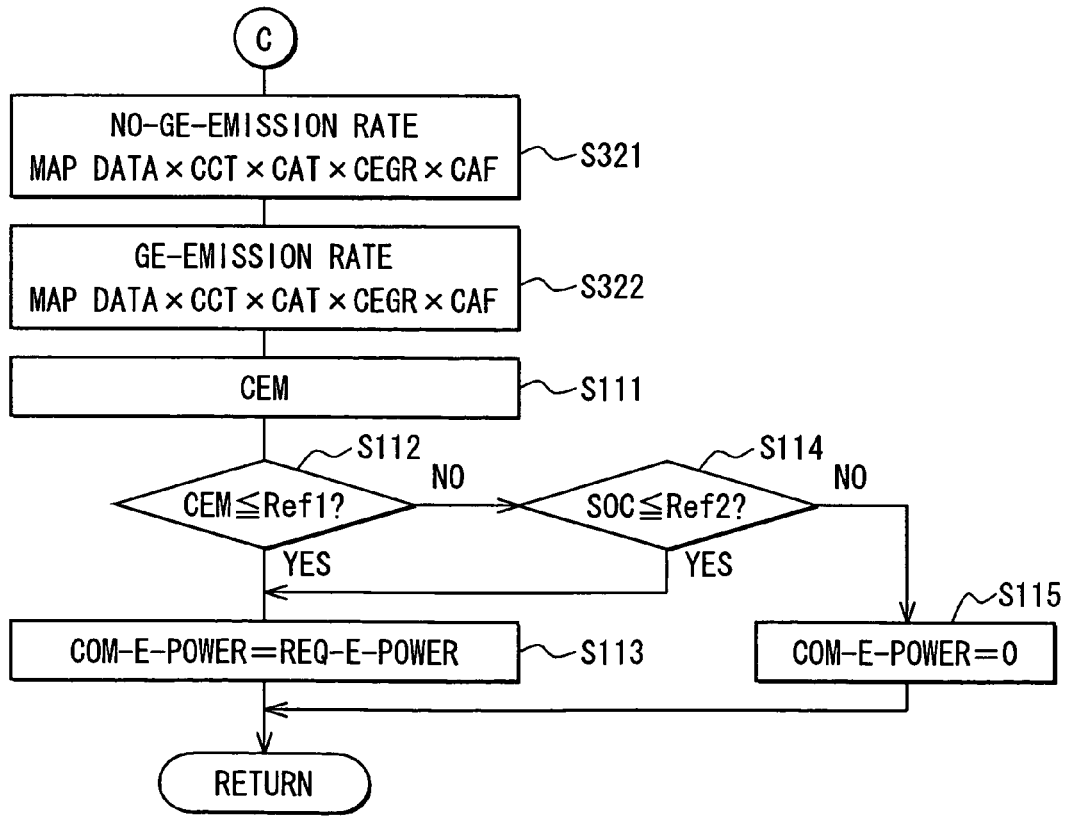
FIG. 11 is a flow diagram of a generation control routine of the generator control device according to the fifth embodiment.

The generator control device 11 operates according to a generation control routine shown in FIGS. 9-11. The control routine is repeated at a certain cycle, such as 8 ms. The control routine includes the same steps S101-S108 for calculating torques necessary for the engine to operate when the alternator does and does not generate electric power.

Thereafter, the step goes to S309, where a coolant temperature detected by a temperature sensor is read. At the next step S310, a coefficient CCT for correcting coolant temperature is calculated based on data of a map. The coefficient CCT is a function of the coolant temperature, an engine operating condition such as the engine rotation speed and the torque without electric generation. Generally, the rate of NOx component becomes lower and the HC component becomes higher as the coolant temperature decreases. Therefore, the rates of the hazardous components emitted from an engine to be stored in the map are detected after the engine has been warmed up. The coefficient CCT is to correct the rates of the hazardous components according to a current coolant temperature.

Thereafter, the step goes to S311, where the intake air temperature detected by a temperature sensor is read. Subsequently, at S312, a coefficient CAT for correcting intake air temperature is calculated based on data of the map. The coefficient CAT is a function of the coolant temperature, an engine operating condition such as the engine rotation speed and the torque without electric generation. Generally, the rate of the NOx component becomes higher as the intake air temperature rises. Therefore, the rates of the hazardous components emitted from the engine to be stored in the map are detected when the intake air temperature is 25° C. The coefficient CAT is to correct the rates of the hazardous components according to a current intake air temperature.

Thereafter, the step goes to S313, where if an EGR valve erroneously opens or not is examined by an EGR diagnosis function that is included in the control device 11. If the result is Yes, the step goes to S314, where an EGR ratio that corresponds to the present engine condition is provided by means of a map or the like. If, on the other hand, the result of S313 is No, the step goes to S315, where if an EGR valve erroneously closes or not is examined by the EGR diagnosis function to go to S316 if the result is Yes, where the EGR ratio is set to 0 or to go S317 if the result is No, where the EGR ratio detected by an EGR ratio sensor is read.

Thereafter, the step goes to S318, where a coefficient CEGR for correcting EGR ratio is calculated based on data of the map. The coefficient CEGR is a function of the EGR ratio, an engine operating condition such as the engine rotation speed and the torque without electric generation. Generally, the rate of NOx component decreases and the HC component increases as the EGR ratio increases. Therefore, the rates of the hazardous components emitted from the engine to be stored in the map are detected after the engine has been warmed up. The coefficient CEGR is to correct the rates of hazardous components that are stored in the map according to a current EGR ratio.

Thereafter, the step goes to S319, where an air-fuel ratio detected by a air-fuel ratio sensor is read. At the next step S320, a coefficient CAF for correcting the air-fuel ratio is calculated based on data of the map. The coefficient CAF is a function of the air fuel ratio, an engine operating condition such as the engine rotation speed and the torque without electric generation. Generally, the rate of NOx component increases as the air-fuel mixture becomes leaner, but decrease as the air-fuel mixture becomes more leaner. Therefore, the rates of the hazardous components emitted from the engine to be stored in the map are detected at a predetermined air-fuel ratio (e.g. theoretical air-fuel ratio). The coefficient CAF is to correct the rates of hazardous components that are stored in the map according to a current air-fuel ratio.

Subsequently, the step goes to S321 shown in FIG. 11, where a basic no-generation emission rate of hazardous components (g/s) that corresponds to a current engine rotation speed and the engine torque without electric generation is read from a map as shown in FIG. 2. An actual no-generation emission rate of hazardous components (g/s) is obtained by multiplying the basic no generation emission rate by the correction coefficients CCT, CAT, CEGR and CAF. That is:

actual no-generation emission rate of hazardous components (g/s) = basic no-generation emission rate of hazardous components (g/s)×CCT ×CAT×CEGR×CAF Then the step goes to S322, where a basic generation emission rate of hazardous components (g/s) that corresponds to a current engine rotation speed and the engine torque with electric generation is calculated based on the map. The basic generation emission rate corresponds to an emission rate of hazardous components when the alternator 16 generates an amount of electric power. An actual generation emission rate of hazardous components (g/s) is obtained by multiplying the basic generation emission rate by the correction coefficients CCT, CAT, CEGR and CAF. That is:

actual generation emission rate of hazardous components (g/s)=basic generation emission rate of hazardous components (g/s)×CCT ×CAT×CEGR×CAF At the next step S111, a difference rate CEM (g/s·kw) between the actual generation emission rate of hazardous components and actual no-generation emission rate of hazardous components is divided by a current electric power generated by the alternator 16 as described above.

The following steps are the same as the steps described in the first embodiment.

As a modification, the step S111 shown in FIG. 3 or S211 shown in FIG. 5, the difference rate CEM (g/s·kw) may be corrected by one, some or all of the engine coolant temperature, the intake air temperature, the air-fuel ratio, the EGR ratio, or conditions (errors) of an EGR system. It is also useful to correct the difference rate CEM by a variable valve timing.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A generator control device for controlling a generator that is driven by an engine to charge a battery and supply electric power to electric loads, the generator control device comprising:

first means for calculating a required electric power;

second means for calculating a difference relating to an amount of a hazardous gas component of engine exhaust gas between a first case in which the generator generates the required electric power and a second case in which the generator does not generate an electric power, and third means for controlling the generator to generate the required electric power if the difference is equal to or smaller than a first reference value.

2. The generator control device according to claim 1, wherein:

said second means calculates a difference rate in an amount of a hazardous component per an electric power to be generated as the difference relating to an amount of a hazardous gas component.

3. The generator control device as claimed in claim 2, wherein:

said third means further comprises means for controlling the generator to charge the battery if a battery charge ratio is not larger than a second reference value even if the difference relating to an amount of a hazardous gas component is larger than the first reference value.

4. The generator control device as claimed in claim 3, wherein:

said second means further comprises means for calculating a difference between a first amount of fuel consumption when the generator generates no electric power and a second amount of fuel consumption when the generator generates an electric power so as to provide the difference; and said third means further comprises means for controlling the generator according to an increase in fuel consumption.

5. The generator control device as claimed in claim 1, wherein:

said second means further comprises means for calculating a difference between a first amount of fuel consumption when the generator generates no electric power and a second amount of fuel consumption when the generator generates an electric power; and said third means further comprises means for controlling the generator according to the difference in fuel consumption.

6. The generator control device as claimed in claim 5, wherein:
said second means further comprises means for dividing the difference between a first amount of fuel consumption and the second amount of fuel consumption by an electric power to be generated to control the generator.

7. The generator control device as claimed in claim 5, wherein said third means further comprises means for controlling the generator to operate in one of a fuel-economic generation range and an emission control generation range according to a predetermined condition.

8. The generator control device as claimed in claim 5, wherein said third means further comprises means for controlling the generator to operate according to electric power consumption.

9. The generator control device as claimed in claim 5, wherein said third means further comprises means for controlling the generator to operate according to engine operating condition.

10. The generator control device as claimed in claim 1, wherein said second means further comprises correction means for correcting the difference relating to an amount of hazardous gas component according to engine coolant temperature.

11. The generator control device as claimed in claim 10, wherein said EGR condition corresponds to whether an EGR system fails or not.

12. The generator control device as claimed claim 1, wherein said second means further comprises correction means for correcting the difference relating to an amount of hazardous gas component according to intake air temperature.

13. The generator control device as claimed claim 1, wherein said second means further comprises correction means for correcting the difference relating to an amount of hazardous gas component according to EGR condition.

14. The generator control device as claimed in claim 1, wherein said second means further comprises correction means for correcting the difference relating to an amount of hazardous gas component according to an air-fuel ratio.

* * * * *